United States Patent [19]

Stoloff

[11] 3,712,717

[45] Jan. 23, 1973

[54] DEVICE FOR ELEVATING AND SUPPORTING BIFOCAL SPECTACLES

[76] Inventor: Charles I. Stoloff, 46 East 91st Street, New York, N.Y. 10028

[22] Filed: May 26, 1971

[21] Appl. No.: 147,007

[52] U.S. Cl....................................351/55, 351/138
[51] Int. Cl............................G02c 5/12, G02c 7/06
[58] Field of Search........................351/55, 137, 138

[56] References Cited

UNITED STATES PATENTS

| 3,087,383 | 4/1963 | Ralph | 351/55 |
| 2,801,569 | 8/1957 | Ralph | 351/55 |
| 2,612,076 | 9/1952 | Dietz | 351/55 |

Primary Examiner—David Schonberg
Assistant Examiner—Robert L. Sherman
Attorney—James & Franklin

[57] ABSTRACT

A device for elevating and supporting a pair of bifocal spectacles for straight ahead near vision embodying a unitary member mountable and demountable from the nose of the user, shaped at its rear to be supported on the saddle bone and bridge of the user's nose and at its front for receiving, lodging and supporting the bridge piece of the spectacles.

5 Claims, 6 Drawing Figures

PATENTED JAN 23 1973 3,712,717

INVENTOR
CHARLES I. STOLOFF
BY
James Franklin
ATTORNEY

DEVICE FOR ELEVATING AND SUPPORTING BIFOCAL SPECTACLES

This invention relates to a device for elevating or raising and supporting the bifocal lenses of a pair of spectacles.

As is well known, for people who require bifocal or multifocal lenses, the lower close-up bifocal or multifocal portions of the lenses are ground into place near the lower part of the lenses so that there will be no interference with the unobstructed long-range vision area of the upper part of the lenses. In the use of common bifocal lenses for spectacles, the lower lens parts are therefore normally so arranged and the spectacles are so mounted for use that the user or wearer looks downwardly through the lenses when using the lower or near vision part of the lenses and looks straight ahead or upwardly when using the distant vision parts of the lenses. However, quite frequently the wearer of multifocal spectacles may desire to use the lower or near vision lens parts while looking straight ahead and without being obliged to tilt the head back.

To accomplish this purpose, various devices have previously been suggested whereby the position of the spectacles, and thus of the lenses, may be raised or vertically elevated to accomodate the location or position of the lenses to effect this desired convenience to the wearer. Such devices as have been heretofore suggested, while attempting to provide relatively simple means for accomplishing the desired purpose, are either relatively complex structurally, particularly as to the manner in which they have to be attached or related to the spectacles' frame (and the bridge piece thereof), or functionally as to the manner in which they are mounted and demounted for intended quick adaptability.

The prime object of my present invention is directed to a device for raising or elevating and supporting a pair of bifocal or multifocal spectacles which is designed not only to accomplish the main purpose of such devices as explained above, but provides a very simple member which is characterized by the following features, structurally and functionally:

a. The device comprises a unitary member mountable on and demountable from the nose of the user, so that the support therefor is effected by its mounting on the user's nose, making it, therefore, unnecessary to provide means thereon engageable with or attachable to a part or parts of the spectacles' frame or the lenses themselves for support thereof;

b. The device, made of a unitary piece, may readily be moved over the user's nose and slipped under the bridge portion of the spectacles, being provided with means for raising the spectacles to the desired level and for thereby, by this mounting step, supporting the spectacles on the device; and c. The device comprising this unitary piece is so shaped that the means thereof used to engage the user's nose and the means thereof used to raise and support the bridge piece of the spectacles comprise the sole means for mutually supporting the device on the user's nose and for supporting the pair of spectacles on the device;

the construction being thereby such that the simple movement upwardly of the device on the wearer's nose to its use position raises and supports the spectacles to the desired level of vision, and the equally simple reverse movement of the device away from the user's nose accomplishes the quick detachment thereof from the spectacles' frame and the consequent demounting of the device from its applied use.

To the accomplishment of the foregoing objects and such other objects as may hereinafter appear, my invention is directed to the device for elevating and supporting bifocal spectacles as defined in the attached claims considered together with the following specification and the appended drawings in which:

FIG. 4 also depicts the manner in which the novel elevating device of the invention is mounted and demounted from the nose of the user or wearer;

Figure 2:
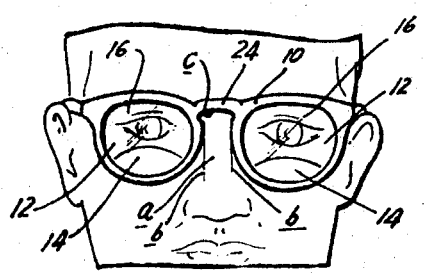
FIG. 2 is a front face view depicting a conventional pair of bifocal spectacles as normally worn by the user, absent the elevating device of the invention.
Figure 3:
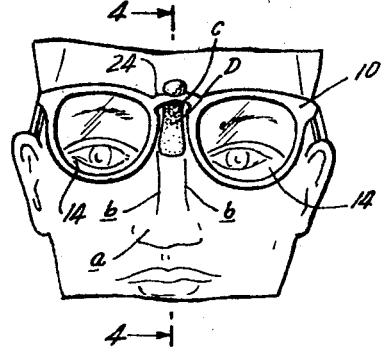
FIG. 3 is a view similar to FIG. 2 depicting the bifocal spectacles in their raised or elevated condition and showing the elevating and supporting device of the present invention in its applied condition.

Referring now in more detail to the drawings, and having reference first to FIG. 2 thereof, the device of the invention is intended to be applied to and used with a pair of spectacles 10 having the bifocal lenses 12, 12, each of such lenses consisting of a lower or near vision part 14, and an upper or long range vision part or area 16. Normally, as this figure indicates, these spectacles are so mounted with reference to the nose a of the user that while the user looks straight ahead when using the distant vision parts of the lenses, he has to look downwardly through the near vision part of the lenses for close-up vision such as for reading purposes. In FIG. 3 of the drawings the pair of spectacles 10 is shown in raised position elevated by the device of the present invention so that the user may now look straight ahead for using the near vision lens parts 14, 14 of the spectacles, the spectacles having been raised into this position by the elevating device D of the invention.

Figure 1:
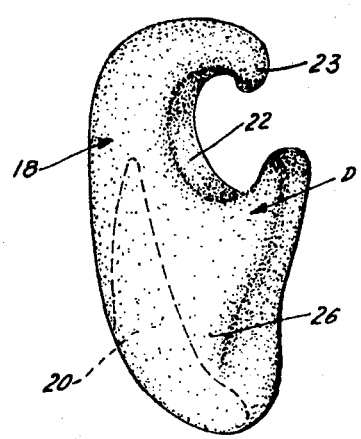
FIG. 1 is a perspective view of the device of my invention for elevating and supporting a pair of bifocal spectacles.

Referring now to FIG. 1 of the drawings, the elevating device D of the invention is shown to consist of a unitary member comprising the following shaped parts: a body generally designated as 18, made preferably from a suitable plastic material, which in its best form is a relatively soft plastic material, the said body being shaped at its rear at 20 so as to straddle and be supported on the wearer's nose as described hereinbelow and being shaped at its front at 22 to receive, elevate and support in elevated condition the bridge piece of the spectacles 10, the said shaped rear and front body parts being the sole means, as further described below, for mutually supporting the device on the user's nose and for supporting the pair of spectacles on the device.

Figure 6:
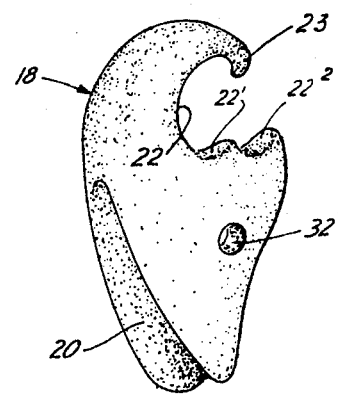
FIG. 6 is a perspective view of the device of the invention shown in a position substantially rotated 90° from the position shown in FIG. 1 and also depicting a modification thereof.
Figure 4:
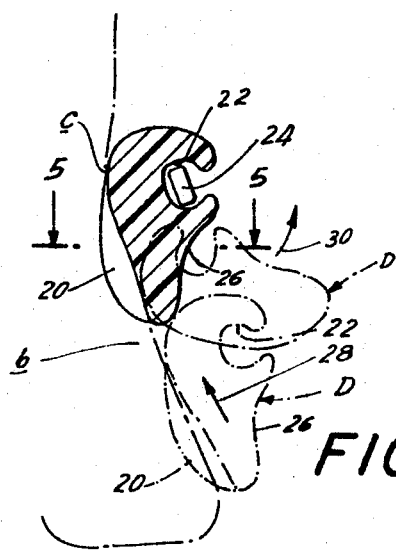
FIG. 4 is a view shown to an enlarged scale of the essential part of FIG. 3 taken in cross section in the plane of the line 4—4 of FIG. 3.
Figure 5:
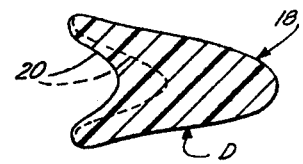
FIG. 5 is a view shown in a 2:1 enlargement of FIG. 4, taken in cross section in the plane of the line 5—5 of FIG. 4.

More specifically stated, the shape 20 at the rear of the body 18 comprises a concave recessed part having the configuration best shown in FIGS. 1 and 6 of the drawings, designed to straddle and fit the saddle bone *b* of the nose (see particularly FIGS. 2—4) as well as the bridge *c* of the nose. The shape 22 at the front of the body 18 comprises an open hook-shaped recessed part which receives, lodges and supports the bridge piece 24 of the spectacles as best depicted in FIGS. 2–4 of the drawings. The rear concave recess 20 is located toward the bottom region (in about the bottom half) of the body 18; and the front open recess 22 is located toward the top region of the body 18.

The bottom region of the body 18 of the device, designated by the reference character 26 defines a finger engaging handle for the device, the device being held by the fingers and moved upwardly along the saddle bone of the nose for mounting the device, and being moveable in a reverse movement in a manner described hereinbelow for demounting the device for the user's nose and from the bridge piece of the spectacles.

With this simple construction it will therefore be evident that I have produced a bifocal spectacles elevating device which, structurally and functionally, provides the following features:

a. The device comprises the unitary member 18 mountable and demountable from the nose *a* of the user, so that the support therefor is effected by its being mounted on the nose of the user. In so mounting the same the concave recess 20 at the rear of the device permits the device to straddle and sit comfortably on the saddle bone *b* of the user's nose and to fit over the bridge *c* thereof. The device therefore makes it unnecessary to provide means thereon engageable with or attachable to a part or parts of the spectacles' frame or the lenses themselves for support of the device;

b. The body 18 of the device, in its upward movement on the nose of the user as indicated by the arrow 28 (FIG. 4) is slipped under the bridge piece 24 of the spectacles, the front recessed part 22 of the device, including the lower hook shaped wall thereof, functioning for catching and lodging the bridge piece of the receptacles and thereby raising the spectacles to the desired level and, by this mounting step, supporting the spectacles on the device as best indicated in FIGS. 3 and 4 of the drawings;

c. As will now be clearly seen, the device D, comprising the described unitary piece, is so shaped that the rear recessed part 20 thereof used to engage and straddle the user's nose and the recessed part 22 thereof used to engage and lodge (and thereby support) the bridge piece of the spectacles comprise the sole means for mutually supporting the device D on the user's nose and for supporting the pair of spectacles 10 on the device; and d. For demounting the device D, the body 18 of the device is rotated in a counter clockwise direction as indicated by the arrow 30 (FIG. 4) upward and off towards the front and away from the user's nose. As the device is thus removed or demounted, the spectacles drop down again on the nose to their usual position.

In FIG. 6 of the drawings, the device of the invention is shown in a slightly modified form in which the front recess comprises two hook-shaped recesses $22'$ and $22^2$ designed for adjustability of the spectacles or/and for use with spectacle bridges of differing thicknesses. Also this form of the invention shows a through aperture 32 formed in the device for receiving a string by which the device may be strung and thereby carried by on an article of clothing of the user when not in mounted condition.

In both forms of the structure of the invention the terminal hook 23 of the upper lip of the hook 22 functions to prevent the device from slipping off or being dislodged inadvertently or accidentally.

The structure, functioning and advantages of the bifocal spectacles mounting and supporting device of the invention are, it is believed fully apparent from the above detailed description thereof. It will be further apparent that changes may be made therein without departing from the spirit of the invention defined in the following claims.

I claim:

1. A device for elevating and supporting bifocal spectacles comprising a unitary member mountable on and demountable from the nose of the user, comprising the following shaped parts: a body shaped at its rear with means to straddle and be supported on the saddle bone of the user's nose, and shaped at its front with means to receive, elevate and support in elevated condition the bridge piece of a pair of spectacles, the means at the front of the body being an open hook-shaped recessed part to receive and support the said bridge piece of the spectacles, and the means of said shaped rear and front bodies being the sole means for mutually supporting the device on the user's nose and for supporting the pair of spectacles on the device.

2. The device of claim 1 for elevating and supporting bifocal spectacles, in which the means at the rear of the body is a part having a concave recess to fit the saddle bone of the nose.

3. The device of claim 2, in which the means at the rear of the body is a concave recessed part shaped to fit the saddle bore of the user's nose and is located toward the bottom region of the body, and the front open recessed part is located toward the top region of the body.

4. The device of claim 3, in which the bottom region of the body defines a finger engageable handle for the device, the device being movable by engaging the handle along the saddle of the nose for mounting the device on and demounting the same from the user's nose and the bridge of the spectacles.

* * * * *